United States Patent [19]

Jörg

[11] Patent Number: 4,563,039

[45] Date of Patent: Jan. 7, 1986

[54] HINGE JOINT FOR USE IN THE SEATS OF MOTOR VEHICLES AND THE LIKE

[75] Inventor: Horst Jörg, Neuhemsbach, Fed. Rep. of Germany

[73] Assignee: Keiper Recaro GmbH & Co., Remscheid, Fed. Rep. of Germany

[21] Appl. No.: 622,710

[22] Filed: Jun. 20, 1984

[30] Foreign Application Priority Data

Jun. 21, 1983 [DE] Fed. Rep. of Germany ....... 3322178

[51] Int. Cl.⁴ .............................. A47C 1/24; B21K 1/30
[52] U.S. Cl. ...................................... 297/362; 16/354; 29/11; 29/159.2; 72/102; 74/804
[58] Field of Search .................. 297/362, 366; 16/354; 29/11, 159.2; 72/102; 74/460, 804, 805

[56] References Cited

U.S. PATENT DOCUMENTS 3,355,930 12/1967 Fedorov ................. 29/159.2 X
3,777,345 12/1973 Brown .................. 29/159.2 X
4,469,376 9/1984 Pelz ........................ 297/362

Primary Examiner—William E. Lyddane
Assistant Examiner—Peter R. Brown
Attorney, Agent, or Firm—Peter K. Kontler

[57] ABSTRACT

A hinge joint which connects the back to the remainder of the seat in a motor vehicle has first and second leaves respectively provided with punched internal and spur gears. The internal gear receives the spur gear and at least one of its internal teeth meshes with two neighboring external teeth of the spur gear or vice versa. The rear sides of the internal and external teeth are formed with punched indentations to compensate for shrinkage of the top lands of such teeth as a result of punching. Each indentation resembles the frustum of a pyramid and is designed to effect the flow of material toward the top land of the respective tooth. The two leaves are coupled to each other by a shaft which defines therefor two parallel pivot axes.

13 Claims, 6 Drawing Figures

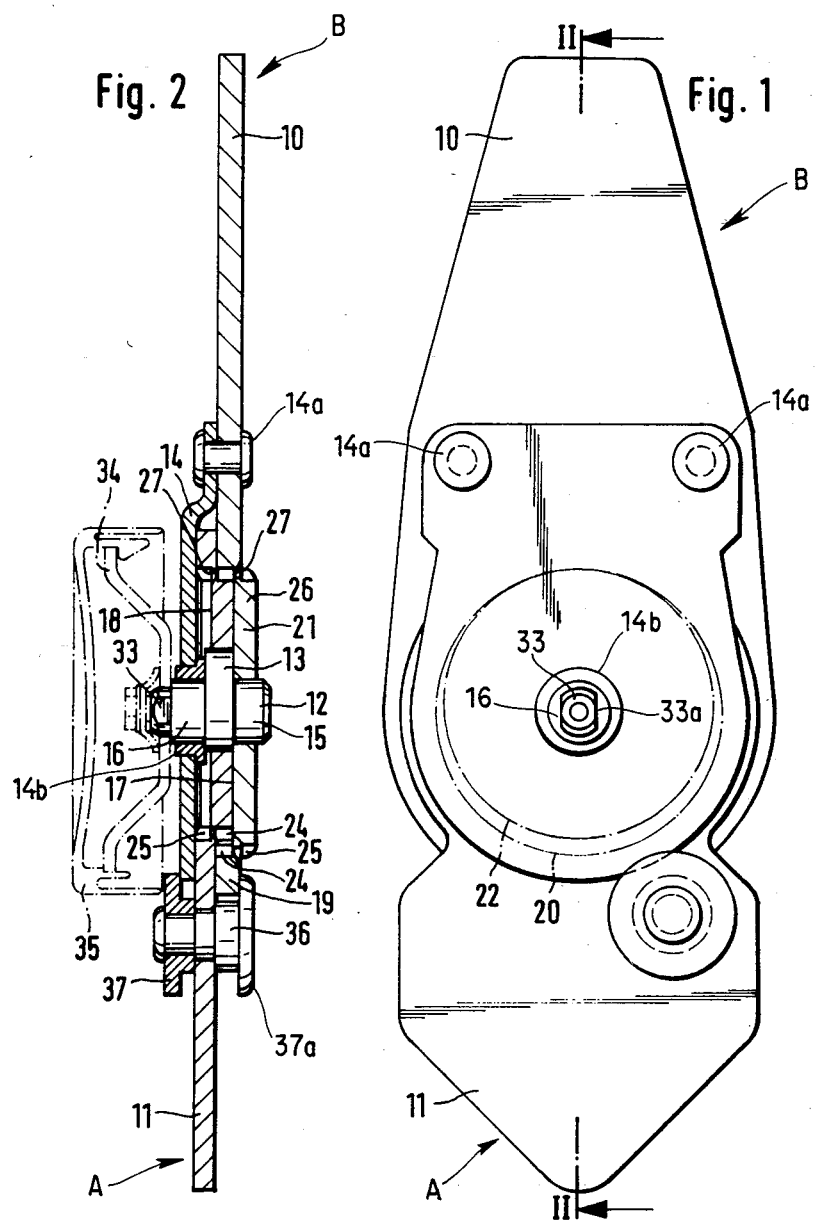

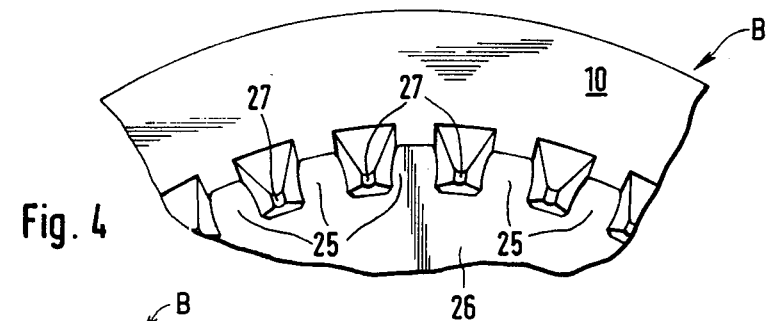
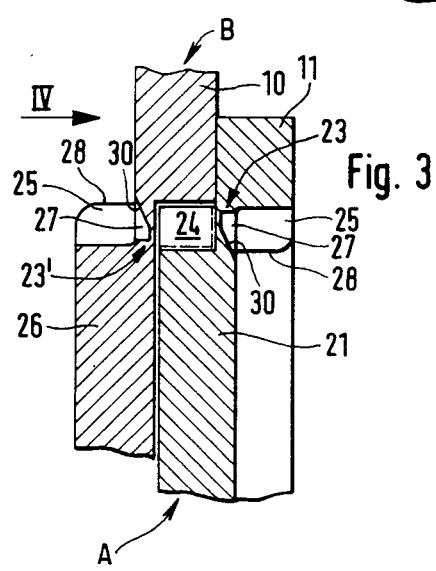
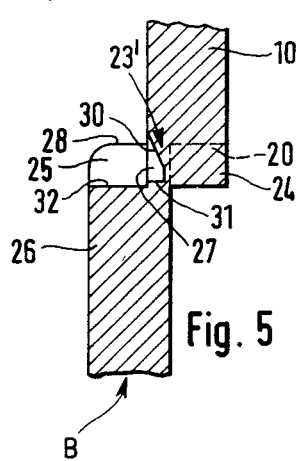
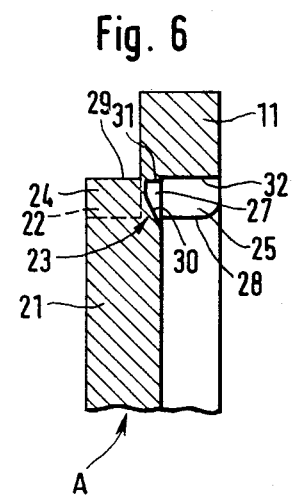

HINGE JOINT FOR USE IN THE SEATS OF MOTOR VEHICLES AND THE LIKE

CROSS-REFERENCE TO RELATED CASE

The hinge joint of the present invention constitutes an improvement over and a further development of the joint which is disclosed in the commonly owned allowed copending patent application Ser. No. 376,846 filed May 10, 1982 by Herbert Pelz, now U.S. Pat. No. 4,469,376.

Reference may also be had to commonly owned German Pat. No. 16 80 128 corresponding to U.S. patent application Ser. No. 783,982 filed Dec. 16, 1968, now abandoned.

BACKGROUND OF THE INVENTION

The present invention relates to improvements in hinges in general, and more particularly to improvements in hinge joints of the type wherein two substantially plate-like components or leaves are coupled to each other for angular movement relative to one another. Such hinge joints can be used for a variety of purposes, for example, to allow for adjustment of the back of a seat relative to the remainder of the seat in a motor vehicle or the like. Still more particularly, the invention relates to improvements in hinge joints of the type wherein the leaves are provided with integral means for holding them in selected angular positions relative to one another in such a way that the angular position of one leaf relative to the other leaf and/or vice versa is changed only when desired by the operator. Such holding means constitute or comprise at least one spur gear with an annulus of active teeth and at least one internal gear or ring gear with an annulus of active internal teeth whereby the spur gear extends into (i.e., it is surrounded by) the internal gear and is in mesh with the latter.

It is already known to convert sheet metal blanks into components of hinge joints with meshing internal and spur gears by resorting to a punching or stamping operation so that each active tooth (namely the tooth which transmits or receives motion) is disposed at one side of the finished stamping and the other side of the stamping is formed with passive teeth which alternate with the active teeth and do not serve to transmit motion but are formed by the die simply as a result of resort to a stamping or punching technique. Such stampings are formed in precision stamping or punching machines. It is important to ensure that all active teeth of the spur gear and of the internal gear assume an optimum shape and size to allow for adequate transmission of motion as well as for proper retention in a selected angular position. Due to the nature of the technique which is resorted to in connection with the making of such stamped components, the outlines of active teeth are not sharp, especially in the regions of their top lands. As a rule, the top lands are slightly rounded due to shrinkage in the course of the stamping operation so that the effective width of active teeth, as considered in the axial direction of the respective gear, is reduced due to the fact that the gears are made from blanks in a stamping or punching press. Consequently, shrinkage or shifting of the material of blanks in the regions of top lands or tips of the active teeth must be taken into consideration in selecting the thickness of blanks in order to ensure that the gears of the finished components will be capable of transmitting forces which are likely to develop in actual use of the hinge joint. In other words, the thickness of blanks which are converted into the components of the aforediscussed hinge joint is actually excessive, and this is attributable to the fact that the stamping or punching operation involves a flow of the material of blanks in directions to reduce the effective width of certain portions of the thus obtained active teeth.

The aforementioned copending patent application Ser. No. 376,846, now U.S. Pat. No. 4,469,376, discloses a hinge joint wherein the blanks undergo a certain treatment which is designed to shift some material toward the top lands of active teeth. This is accomplished by the provision of so-called punching indentations which are impressed into selected portions of the blanks to cause some material to flow toward the unsatisfactory portions of active teeth which are formed in a stamping press. To this end, the components are formed with circumferentially complete grooves in the regions of dedendum circles of teeth of the spur gear as well as the internal gear. This causes some material flow toward the top lands and imparts to the tips of teeth a more or less polygonal shape of a more satisfactory width, as considered in the axial direction. However, the provision of such grooves entails a weakening of active teeth in the region of their root portions, i.e., the thickness of junctions between the roots of active teeth and the remaining portions of each of the two gears is reduced by the depth of the respective grooves.

OBJECTS AND SUMMARY OF THE INVENTION

An object of the invention is to provide a novel and improved hinge joint which is just as simple as the aforediscussed joint but wherein the shifting of material in directions to compensate for the flaws of the stamping or punching operation is effected in a different way so as to avoid the weakening of teeth at their roots as a result of intentional shifting some material toward the top lands.

Another object of the invention is to provide a hinge joint whose stability is more pronounced than that of heretofore known joints and whose teeth exhibit the requisite width in each and every portion thereof.

A further object of the invention is to provide a hinge joint whose mutually adjustable components can be made of relatively thin blanks the thickness of which need not be increased for the sole purpose of compensating for the absence of satisfactory effective width in the regions of top lands of active teeth.

An additional object of the invention is to provide a hinge joint which can be used as a superior substitute for heretofore known joints in the seats of motor vehicles and for related purposes.

Still another object of the invention is to provide a novel and improved method of converting sheet metal blanks into the components of a hinge joint.

An additional object of the invention is to provide novel and improved leaves for use in the above outlined hinge joint.

A further object of the invention is to provide a novel and improved method of shifting the material of a stamping which has active and passive teeth in such a way that the width of active teeth is increased, especially in the regions of their top lands.

Another object of the invention is to provide a hinge joint whose initial cost does not exceed that of heretofore known joints even though it is capable of transmitting identical forces with resort to thinner leaves.

One feature of the invention resides in the provision of a hinge joint which can be used with advantage to change the mutual positions of two parts of a seat in a motor vehicle, for example, to change the inclination of the back of the driver's seat relative to the remaining portion of such seat. The improved hinge joint comprises substantially plate-like first and second components each of which is a stamping, e.g., a preferably metallic blank which has undergone precision treatment in a stamping or punching press. The first sides of the two components face each other and the second sides of such components face away from one another. The first component can be said to constitute a patrix and has a depressed inner section surrounded by an outer section and constituting a spur gear extending beyond the first side of the outer section and having an annulus of active teeth at its first side and an annulus of passive teeth which are disposed at its second side and alternate with the active teeth, as considered in the circumferential direction of the spur gear. The rear sides of the active teeth are disposed at the second side of the inner section and alternate with the passive teeth. The second component can be said to constitute a matrix and includes a depressed inner portion which is surrounded by an outer portion and extends beyond the second side of the outer portion to constitute a ring gear or internal gear having an annulus of active internal teeth at the first side of the inner portion and an annulus of passive teeth which are disposed at the second side of the inner portion and alternate with the internal teeth. The rear sides of internal teeth are disposed at the second side of the inner portion and alternate with the passive teeth of the internal gear. At least one active tooth of the internal gear is in mesh with the neighboring active teeth of the spur gear, i.e., the latter extends into the internal gear. At least one of the two components has punched indentations which are provided in the rear sides of the respective active teeth between the neighboring passive teeth, and the hinge joint further comprises means for coupling the two components for angular movement (when necessary) relative to one another. Such coupling means defines two parallel pivot axes, one for each of the two components. In accordance with a presently preferred embodiment of the invention, the indentations constitute or resemble pyramidal frusta, i.e., the surfaces or facets bounding such indentations are those of truncated pyramids.

The depth of each indentation can increase gradually radially of the respective gear in a direction from the top lands of the neighboring passive teeth toward the top lands of the respective active teeth. The top lands of the active teeth of the spur gear are disposed radially outwardly of the top lands of the respective passive teeth, and the top lands of active teeth of the internal gear are disposed radially inwardly to the top lands of the respective passive teeth. The indentations preferably terminate at or close to the level of root portions of the respective active teeth, as considered radially of the respective gears. The outlines of the indentations can at least approximate or resemble the outlines of the rear sides of the respective active teeth. It is presently preferred to provide punched indentations in the rear sides of both annuli of active teeth, and all indentations of a component are preferably identical.

The inner section of the first component includes a ring-shaped web which connects it to the outer section and is provided with the respective active and passive teeth. Also, the inner portion of the second component comprises a ring-shaped web which constitutes the transition between the inner and outer portions and is provided with the respective active and passive teeth.

Means is preferably provided for turning one of the two components relative to the other component for the purpose of changing the inclination of the back of a seat if the hinge joint serves to connect the back to the remainder of the seat.

The thickness of each of the two components is or can be at least substantially constant, i.e., each such component can be made of a flat blank consisting of sheet metal or the like.

The number of active teeth on one of the gears exceeds the number of active teeth on the other gear by n wherein n is a whole number including one.

The coupling means can include a shaft having a first portion which defines the axis for one of the components and a second portion which is eccentric to the first portion and defines the axis for the other component.

The indentations are located and dimensioned in such a way that they can at least substantially compensate for shrinkage of the top lands of the respective active teeth during punching or stamping of the corresponding blank to convert it into the aforementioned matrix or patrix.

The novel features which are considered as characteristic of the invention are set forth in particular in the appended claims. The improved hinge joint itself, however, both as to its construction, the mode of making and assembling it, and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a front elevational view of a hinge joint which embodies one form of the invention;

FIG. 2 is a sectional view substantially as seen in the direction of arrows from the line II—II of FIG. 1;

FIG. 3 is an enlarged view of a portion of the structure is shown in FIG. 2;

FIG. 4 is an elevational view as seen in the direction of arrow IV in FIG. 3;

FIG. 5 is a fragmentary sectional view of that component which is provided with the internal gear; and FIG. 6 is a fragmentary sectional view of that component which is provided with the spur gear.

DESCRIPTION OF THE PREFERRED EMBODIMENTS

Referring first to FIGS. 1 and 2, there is shown a hinge joint which comprises a first component A, a second component B and a coupling element 12 which provides for the components A and B two parallel pivot axes. The component A is a stamping which constitutes one leaf or plate of the hinge joint, and the component B is also a stamping which constitutes another leaf or plate of the hinge joint. For example, the component B can be affixed to the back of a seat in a motor vehicle, and the component A can be affixed to the remaining part of the seat so that the two components allow for changes in the inclination of the back for convenience of the driver or another occupant of the vehicle. The back and the remainder of the seat can be connected to each other by two or more hinge joints of the type shown in FIGS. 1 and 2.

The coupling element 12 is a shaft which includes two coaxial portions 15, 16 defining a pivot axis for the component B, and an eccentric portion 13 between the portions 15, 16. The portion 13 defines a pivot axis for the component A. The two axes are parallel to each other. The reference character 14 denotes a panel or cheek which is secured to the component B by rivets 14a and can be considered an integral part of the latter. The cheek 14 is mounted on a bearing 14b which surrounds the portion 16 of the shaft 12. As can be seen in FIG. 2, a depressed inner or central portion 17 of the component B is turnably mounted on the shaft portion 15. The depressed inner portion 17 and the panel 14 flank a depressed inner section 18 of the component A.

The depressed inner section 18 of the component A constitutes or comprises a spur gear 21 which is surrounded by an outer section 11. The inner portion 17 of the section B constitutes or includes an internal or ring gear 19 and is surrounded by an outer portion 10 of the component B. The spur gear 21 extends into the internal gear 19. The first sides of the two components (namely the right-hand side of the component A and the left-hand side of the component B, as viewed in FIG. 2) face and are adjacent to each other, and the second sides of such components face away from each other. The internal gear 19 of the inner portion 17 has an annulus 20 of active internal teeth 24 (see also FIGS. 3 and 5), and the spur gear 21 has an annulus 22 of active teeth 24 (see FIGS. 3 and 6) at least one of which mates with two neighboring active teeth 24 of the internal gear 19. The annulus 22 of active teeth 24 of the spur gear 21 is provided in a ring-shaped web 23 which connects the inner section 18 of the component A with the outer section 11. A similar ring-shaped web 23' connects the central region 26 of the inner portion 17 with the outer portion 10 and the teeth 24 of the annulus 20 are provided in the web 23'. The gears 19 and 21 are formed by stamping in precision stamping machines which are caused to shift the section 18 relative to the section 11 and to shift the portion 17 relative to the portion 10. The active teeth 24 of the annuli 20 and 22 are formed in the course of the respective stamping operation.

The active (motion transmitting) teeth 24 of the internal gear 19 are disposed at the first side of the inner portion 17, and the second side of such inner portion is formed with an annulus of passive teeth 25 which alternate with the active teeth 24, as considered in the circumferential direction of the internal gear 19. The teeth 25 are called passive teeth because they are formed solely as a result of the making of active teeth 24 and are not called upon to transmit motion or torque. Analogously, the second side of the spur gear 21 is formed with an annulus of passive teeth 25 which alternate with the active teeth 24 of this spur gear, as considered in the circumferential direction of the depressed inner section 18 of the component A. The angular offset of passive teeth 25 relative to the respective active teeth 24 equals half the pitch of teeth 24, i.e., half the distance between the centers of two neighboring active teeth 24.

In accordance with a feature of the invention, the rear sides of the active teeth 24 of the spur gear 21, as well as the rear sides of active teeth 24 of the internal gear 19, are formed with punched or stamped indentations 27 of the type best shown in FIGS. 3, 4, 5 and 6. Each such indentation 27 is disposed in the second side of the respective component and between two neighboirng passive teeth 25. The material which is displaced as a result of the formation of indentations 27 serves to compensate for shrinkage or undesirable distribution of material in certain portions of active teeth 24 in the course of the stamping operation, particularly in the region of the top land 29 of each active tooth 24. While it is possible to form indentations 27 of any one of a wide variety of different sizes and shapes, it is presently preferred to make these indentations in the form of pyramidal frusta, i.e., the surfaces bounding the indentations 27 are those of truncated pyramids whose shape resembles or matches the outlines of the rear sides of the respective active teeth 24. Each indentation 27 extends radially of the respective web 23 or 23' from the top lands 28 of the neighboring passive teeth 25 to the top land 29 of the respective active tooth 24. Furthermore, and as can be seen in FIGS. 5 and 6, the depth of each indentation 27 increases gradually in the same direction, namely from the top lands 28 of neighboring passive teeth 25 toward the top land 29 of the corresponding active tooth 24. Thus, the bottom surface or facet 30 in the indentation 27 shown in FIG. 5 slopes upwardly and to the left toward the top land 28 of the illustrated passive tooth 25 because the active tooth 24 of the internal gear 19 has its top land 29 located radially inwardly of the top lands 28 of adjacent passive teeth 25. The inclination of the facet 30 is reversed in FIG. 6 which shows one active tooth 24 of the spur gear 21; the top land 29 of such active tooth 24 is located radially outwardly of the top land 28 of the adjacent passive teeth 25. The reference characters 31 denote further facets in the indentations 27; such facets are disposed in the regions of top lands 29 of the respective active teeth 24 and are adjacent to the deepmost portions of the respective indentations 27. The root portions of the passive teeth 25 are shown at 32; such root portions are adjacent to the deepmost portions of the neighboring indentations 27.

The reduction factor which develops as a result of resort to a stamping or punching operation can be reduced still further or can be compensated for even more effectively if the other facets bounding the indentations 27 also slope toward the deepmost portions of such indentations; this can be readily seen in FIG. 4. FIGS. 3 to 6 further show that the indentations 27 can extend slightly beyond the top lands 28 of the neighboring passive teeth 25, i.e., radially outwardly beyond such passive teeth as seen in FIGS. 3, 4 and 5 for the passive teeth of the internal gear 19 and radially inwardly beyond such passive teeth of the spur gear 21, as viewed in FIGS. 3 and 6. As mentioned above, the outline of each indentation 27 at the second side of the respective component A or B equals or approximates that of the rear side of the respective active tooth 24; this ensures shifting of substantial quantities of material in directions to compensate for the effect of the stamping operation, i.e., to shift substantial quantities of material toward the top lands 29 of the active teeth 24 and to thus increase the effective width of the top lands 29, as considered in the axial direction of the gears 19 and 21.

The addendum circle of the spur gear 21 is smaller than the dedendum circle of the internal gear 19; the difference between the diameters of these circles at least equals the radial dimension of an active tooth 24. The number of active teeth 24 which form part of the internal gear 19 equals m+n wherein m is the number of teeth 24 forming part of the spur gear 21 and n is a whole number including one. This ensures that, when the shaft 12 is rotated, the gears 19 and 21 move angularly relative to each other, i.e., that the component A changes its angular position relative to the component B and/or vice versa. The eccentric portion 13 of the shaft 12 ensures that at least one active tooth 24 of the internal gear 19 meshes with two neighboring active teeth 24 of the spur gear 21, or vice versa, at all times.

The portion 16 of the shaft 12 has an extension 33 which extends outwardly beyond the exposed side of the panel 14 and has two parallel flats 33a. The extension 33 is received in a complementary bore of a motion transmitting disc 34 which is indicated in FIG. 2 by phantom lines and which cannot rotate relative to the shaft 12 due to the provison of flats 33a. The disc 34 is connected with a hand wheel 35 or another suitable actuating element (shown in FIG. 2 by phantom lines) which can be used to change the mutual positions of the components A and B. The reference character 36 denotes a rivet whose shank extends through the outer section 11 of the component A, one head 37 of which overlies the outer side of the marginal portion of the panel 14 and the other head 37a of which overlies the second side of the marginal zone of the outer portion 10 of the component B. Thus, the rivet 36 prevents movements of the panel 14, component A and component B relative to each other, as considered in the axial direction of the shaft 12.

The manner in which the components A and B can be secured to the corresponding parts of a seat or chain is not shown in the drawing. For example, the fastener means can comprise suitable screws or bolts. Alternatively, the components A and B can be provided with projection seams for welding or soldering to the corresponding parts of the seat or chair.

The components A and B are made of flat blanks consisting of sheet metal or the like. Such blanks are stamped in a first step to provide the respective gears 19, 21 with their active teeth 24 and passive teeth 25, and the next step involves the making of indentations 27 in at least one of these components, preferably in each component, so as to ensure a desirable shifting of the material of stampings in directions to enhance the strength characteristics of active teeth without any weakening of the active teeth in the regions of their root portions. As mentioned above, the aforedescribed presently preferred frustopyramidal shape of punching indentations 27 ensures a highly desirable flow of material toward the top lands 29 of the active teeth 24.

It will be readily appreciated that the improved hinge joint can be put to a number of different uses, not only to connect the backs with the remaining parts of seats in motor vehicles or the like. For example, the improved hinge joint can be used with equal or similar advantage in all kinds of devices which employ stampings constituting or including spur gears, internal gears or other types of gears wherein the distribution of material in active teeth is not entirely satisfactory due to resort to a stamping or punching operation so that a remedial action is necessary in order to increase the effective width of affected portions of active teeth and to thus avoid the use of thicker, heavier and more expensive blanks. For example, gears whose active teeth are improved with resort to punching indentations in a manner as described above can be used with equal advantage in mechanisms which serve to change the position of the entire seat with reference to the frame of a motor vehicle, in mechanisms which are used to change the level of seats in motor vehicles, in mechanisms for raising and lowering the windows in motor vehicles and/or many others. Still further, each component of the improved hinge joint can be provided with several stamped gears. Since the depth of frustopyramidal indentations 27 is smallest in the regions of root portions of the active teeth 24, and since such indentations do not extend into the passive teeth 25, they do not unduly weaken the active teeth and/or the respective webs so that the provision of such indentations does not reduce the overall strength characteristics of those parts of the components A and B which are desgined to transmit motion when the mutual positions of the components must be changed. This is due to the fact that the indentations 27 effect (either primarily or exclusively) the flow of material toward the top lands 29 of active teeth 24 but do not appreciably weaken the root portions of the active teeth. The flow of material which takes place during the making of indentations 27 is in the axial direction of the respective gear 19 or 21. The inclined facets which flank the indentations 27 ensure a gradual or smooth transition from active teeth 24 to the surrounding portions of the respective components and reduce the notch effect. Moreover, and as mentioned above, such configuration of the surfaces bounding the indentations 27 ensures that the material invariably flows in directions which are best suited to ensure the formation of superior active teeth, namely in directions to increase the effective width of top lands of the active teeth. It has been found that the making of indentations 27 ensures such formation of top lands of active teeth that the rounded edges which are typical of stamped teeth disappear and that each top land is bounded by mutually inclined facets which define rather pronounced edges with attendant pronounced increase in effective width of the top lands. The formation of top lands with pronounced edges between the facets of active teeth is further promoted due to the aforediscussed gradual deepening of the indentations 27 in directions from the top lands 28 of the neighboring passive teeth 25 toward the top lands 29 of the respective active teeth 24.

The provision of aforediscussed punching indentations 27 in the rear sides of the active teeth 24 renders it possible to achieve substantial savings in the material of blanks which are converted into the components A and B of the improved hinge joint. This is due to the fact that the thickness of the blanks need not be increased for the sole purpose of ensuring the making of active teeth whose top lands have the required effective width, as considered in the axial direction of the respective gears. Rather, the thickness of the blanks must be selected solely with a view to ensure that the components A and B are sufficiently stable for their intended purposes. As concerns the strength and configuration of active teeth 24, these requirements are met by the formation of punching indentations 27, i.e., not by selecting relatively thick blanks. Shifting of material as a result of the making of indentations 27 does not weaken the root portions of active teeth 24 and/or any other portions of the components which must take up or transmit pronounced forces. The provision of indentations 27 in no way affects the stability of the webs 23 and 23' in the regions of passive teeth 25. This, in turn, ensures that the connections (webs 23, 23') between the inner and outer portions of the component B and the inner and outer sections of the component A exhibit the required stability.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hinge joint, particularly for changing the mutual positions of two parts of a seat in a motor vehicle or the like, comprising substantially plate-like first and second components each of which constitutes a stamping, said components having first sides facing each other and second sides facing away from each other, said first component having a depressed inner section and an outer section surrounding said inner section, said inner section extending beyond the first side of the outer section and constituting a spur gear having an annulus of active teeth at the first side and an annulus of passive teeth disposed at the second side of said inner section and alternating with said active teeth, said active teeth having rear sides at the second side of said inner section, said second component including a depressed inner portion and an outer portion surrounding said inner portion and said inner portion extending beyond the second side of said outer portion and constituting an internal gear having an annulus of active internal teeth at the first side of said inner portion and an annulus of passive teeth disposed at the second side of said inner portion and alternating with said internal teeth, said internal teeth having rear sides at the second side of said inner portion, said spur gear extending into said internal gear and at least one internal tooth being in mesh with the neighboring active teeth of said spur gear, at least one of said components having punched indentations disposed between the passive teeth thereof and provided in the rear sides of the respective active teeth; and means for coupling said components for angular movement relative to each other, said coupling means defining two pivot axes, one for each of said components.

2. The hinge joint of claim 1, wherein at least some of said indentations constitute frusta of pyramids.

3. The hinge joint of claim 1, wherein each of said teeth has a top land and a root portion and the depth of each of said indentations increases at least substantially gradually in a direction from the top lands of the neighboring passive teeth toward the top lands of the respective active teeth.

4. The hinge joint of claim 3, wherein said indentations terminate at the general level of the root portions of the neighboring passive teeth, as considered radially of the respective gear.

5. The hinge joint of claim 1, wherein the outlines of said indentations at least approximate the outlines of said rear sides of the respective active teeth.

6. The hinge joint of claim 1, wherein said inner section comprises a circumferential web which is provided with the respective active and passive teeth and connects said inner section to said outer section, said inner portion having a circumferential web which connects said inner portion to said outer portion and is provided with the respective active and passive teeth, said indentations being provided in the respective web.

7. The hinge joint of claim 1, wherein the rear side of each of said active teeth has a punched indentation.

8. The hinge joint of claim 1, further comprising means for turning one of said components relative to the other of said components about the respective axis.

9. The hinge joint of claim 1, wherein the thickness of each of said components is at least substantially constant.

10. The hinge joint of claim 1, wherein the number of active teeth of one of said gears equals m+n, m being the number of active teeth on the other of said gears and n being a whole number including one.

11. The hinge joint of claim 10, wherein said coupling means comprises at least one first portion which defines one of said axes and at least one second portion which is eccentric to said first portion and defines the other of said axes.

12. The hinge joint of claim 1, wherein all of said indentations are at least substantially identical.

13. The hinge joint of claim 1, wherein said indentations at least substantially compensate for shrinkage of the respective active teeth as a result of punching of the respective component for the purpose of forming the corresponding active and passive teeth.

* * * * *